US006656306B1

(12) United States Patent
Mabbott

(10) Patent No.: US 6,656,306 B1
(45) Date of Patent: Dec. 2, 2003

(54) METHOD FOR THE PREPARATION AND APPLICATION OF PRESSURE AND HEAT APPLIED IMAGE TRANSFERS

(75) Inventor: Robert John Mabbott, High Peak (GB)

(73) Assignee: Focal Design Studios Limited, Derbyshire (GB)

(*) Notice: Subject to any disclaimer, the term of this patent is extended or adjusted under 35 U.S.C. 154(b) by 0 days.

(21) Appl. No.: 09/380,649

(22) PCT Filed: Mar. 6, 1998

(86) PCT No.: PCT/GB98/00689

§ 371 (c)(1), (2), (4) Date: Sep. 13, 1999

(87) PCT Pub. No.: WO98/39166

PCT Pub. Date: Sep. 11, 1998

(30) Foreign Application Priority Data

Mar. 6, 1997 (GB) ........................................ 9704628
Dec. 20, 1997 (GB) ........................................ 9726842

(51) Int. Cl.$^{7}$ ........................ B44C 1/165; B32B 31/20; B41M 3/12; C09J 2/02

(52) U.S. Cl. ...................... 156/230; 156/234; 156/239; 156/240; 156/247; 156/277; 156/289; 427/148; 428/42.1; 428/195; 428/200; 428/202; 428/352; 428/914

(58) Field of Search ................................ 156/230, 233, 156/234, 238, 239, 240, 241, 247, 277, 289; 427/146, 147, 148; 428/41.8, 42.1, 41.6, 195, 200, 201, 202, 203, 204, 343, 344, 352, 914, 915

(56) References Cited

U.S. PATENT DOCUMENTS

| | | | | | |
|---|---|---|---|---|---|
| 2,990,311 | A | * | 6/1961 | Shepherd, Jr. | 156/234 |
| 3,741,787 | A | * | 6/1973 | Tordjman | 428/201 |
| 4,111,734 | A | * | 9/1978 | Rosenfeld | 156/234 |
| 4,322,467 | A | * | 3/1982 | Heimbach et al. | 428/200 |
| 4,555,436 | A | * | 11/1985 | Geurtsen et al. | 428/200 |
| 4,640,727 | A | * | 2/1987 | Janssen | 156/240 |
| 4,824,498 | A | * | 4/1989 | Goodwin et al. | 156/71 |
| 4,919,994 | A | * | 4/1990 | Incremona et al. | 428/141 |
| 5,520,763 | A | * | 5/1996 | Jonhstone | 156/233 |
| 5,800,656 | A | * | 9/1998 | Geurtsen et al. | 156/239 |
| 5,888,644 | A | * | 3/1999 | Yoshida et al. | 428/323 |
| 5,932,352 | A | * | 8/1999 | Higgins | 428/423.1 |

FOREIGN PATENT DOCUMENTS

| | | | | |
|---|---|---|---|---|
| WO | WO 97/01798 | * | 1/1997 | G03B/13/20 |

* cited by examiner

*Primary Examiner*—J. A. Lorengo
(74) *Attorney, Agent, or Firm*—Bracewell & Patterson, L.L.P.

(57) ABSTRACT

There is disclosed a method for preparing a pressure and/or heat applied image transfer sheet and applying an image therefrom to a target surface comprising: applying an image layer to an image area of an image release system on a support, the image release system comprising an image release surface; applying a pressure and/or heat activated adhesive layer over i) the image release system including the image area, and/or ii) at least a portion of the target surface, which adhesive layer adheres more strongly to the image layer than the image layer does to the release surface; contacting, with the application of pressure and/or heat, the target surface and the image transfer sheet such that the dried adhesive layer attaches only in the image area to i) the target surface and/or ii) the image transfer sheet; and peeling off the support together with the adhesive layer except for the image area which is left attached to the target surface.

46 Claims, 4 Drawing Sheets

FIG. 7A
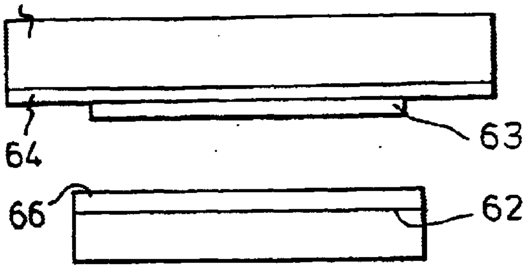
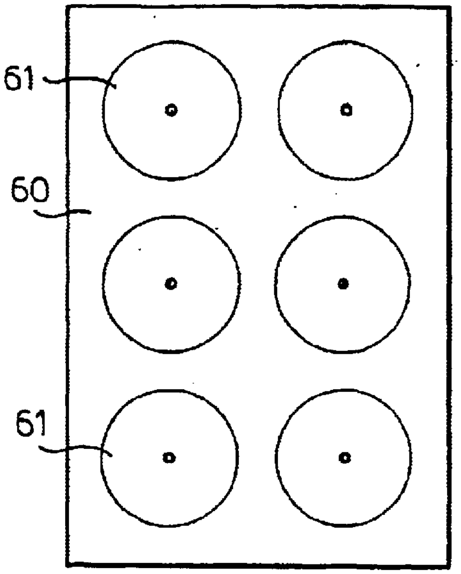
FIG. 6
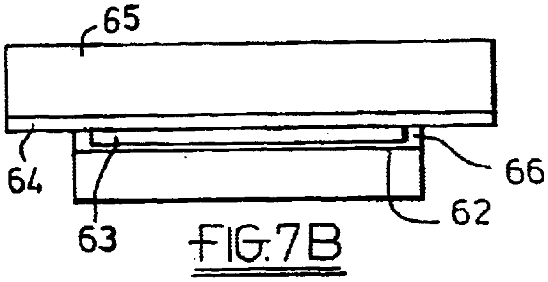
FIG. 7B
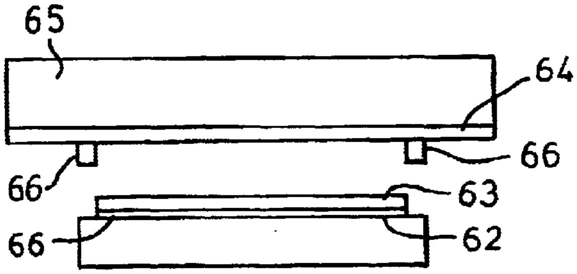
FIG. 7C
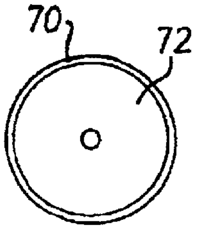
FIG. 8A
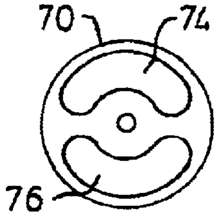
FIG. 8B
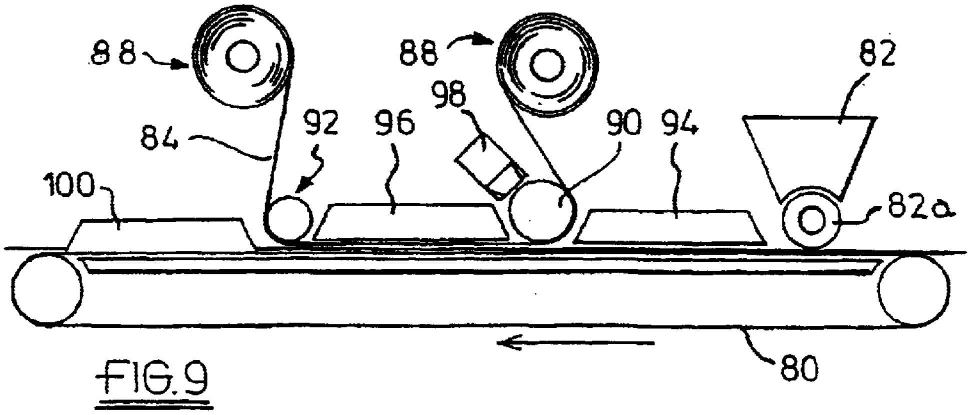
FIG. 9

METHOD FOR THE PREPARATION AND APPLICATION OF PRESSURE AND HEAT APPLIED IMAGE TRANSFERS

This invention relates to pressure and/or heat applied image transfers—this includes rub-down image transfers, but rubbing down is not the only method of transferring the image from the image carrier to the target surface.

Rub-down image transfers are well-known—the system sold under the trade name "Letraset" will be very familiar, which appears as sheet with various indicia including letters and numerals in different type faces which can be transferred from the face of the sheet on to the target surface (e.g. a drawing on paper) by placing the image face against the paper and rubbing down or burnishing the back of the sheet so that the letter or numeral becomes attached to the target surface and detached from the sheet.

There have been several attempts to extend this process into full colour reprographics, and such attempts have involved more or less complicated procedures and the use of particular materials with some limitations as to the nature of the final target surface, all at considerable cost, in terms of both materials cost and processing cost and complexity.

The present invention provides methods for preparing a pressure and/or heat applied image transfer sheet, and such sheets, which are less expensive and easier to use, with superior results, as compared to prior art techniques. The methods are applicable to a wide range of target surfaces, including compact discs and leather items. Furthermore, the methods can be adapted for use in mass production applications.

The invention comprises a method for preparing a pressure and/or heat applied image transfer sheet and applying an image therefrom to a target surface comprising:

applying an image layer to an image area of an image release system on a support, the image release system comprising an image release surface;

applying a pressure-activated and/or heat activated adhesive layer over i) the image release system including the image area and/or ii) at least a portion of the target surface, which adhesive layer adheres more strongly to the image layer than the image layer does to the release surface;

contacting, with the application of pressure and/or heat, the target surface and the image transfer sheet such that the dried adhesive layer attaches only in the image area to i) the target surface and/or ii) the image transfer sheet;

and peeling off the support together with the adhesive layer except for the image area which is left attached to the target surface.

The method may comprise:

applying a pressure and/or heat activated adhesive layer over the image release system including the image area;

such that when the dried adhesive layer is applied to a target surface with the application of pressure and/or heat it attaches to the target surface only in the image area but is otherwise retained by the support.

Alternatively, the method may comprise:

applying a pressure and/or heat activated adhesive layer over at least a portion of the target surface;

contacting, with the application of pressure and/or heat, the target surface and the image transfer sheet such that the dried adhesive attaches only in the image area to the image transfer sheet.

The release surface may be on a film support layer which is itself attached to a backing by a release coat on a backing adhesive coat of the backing, the backing being first peelable from the support so as to leave the image visible through the film.

The image layer may be applied using a dry toner medium, or an ink or a paint. The image may be masked with a white pigment.

The image may be applied using a dry toner electrophotographic process (xerography) or an electroink printing process (e.g. the Indigo (trademark) process).

White pigment masking, in xerography may be by way of a white pigment foil; in electroink printing, a white pigment ink may be used.

The purpose of the white pigment masking is threefold—first, it allows pastel shades to be properly represented, it protects the image, which would otherwise be exposed and liable to damage, second it creates opacity.

The image may be masked with a metallised foil.

The image may be masked with a holographic element.

The image release system may bind the image layer to the image release surface with an interfacial tension of 38–39 dynes/$cm^2$, or may be surface treated, as by a corona discharge treatment, to attain a suitable surface tension, though corona treatment tends to apply only a temporary effect.

The adhesive layer may be applied just prior to application to the contacting of the target and the image transfer sheet. It may be applied by spraying or by roller coating, when organic solvent based adhesives will be found suitable, or it may be applied by means of an adhesive sheet, in which the adhesive may be water-based.

The image release system may bind the adhesive layer to the image release surface with a surface tension 4–5 dynes/$cm^2$ less than that which it binds the image layer to the image release surface.

The image release system may bind the adhesive layer to the image release surface with a surface tension of 34 dynes/$cm^2$.

The adhesive may be activated solely by heat and is desirably fast drying so that application to the target surface is not delayed too long after application of the adhesive.

Application of pressure to transfer the image to the target surface may be by means of a pressure roller, which may be used hot or cold, by a plate, as in foil blocking, or by burnishing—fingers may suffice, but burnishing tools capable of applying higher, more localised pressure will usually be preferred.

The target surface may comprise a surface of a compact disc, in which instance the adhesive layer may be applied over the entire surface of the compact disc or one or more selected portions of the surface of the compact disc.

Images may be transferred to a plurality of target surfaces. These target surfaces may comprise the surfaces of objects positioned on a moveable web, and the image transfer sheet may comprise a web having a plurality of image areas, the web being fed by rollers so as to contact the target surfaces. The adhesive layer may be applied to the web which has a plurality of image areas.

The target surface may comprise glass, plastic, fabric, wood or leather.

The invention also comprises an image transfer system comprising a pressure and/or heat applied image transfer sheet comprising an image release system on a support, the image release system comprising an image release surface and adapted to receive an image layer on any part of the image release system (the image area) which image layer is releasably held on said surface, and a pressure activated adhesive to be applied after the image to the image release system including the image area and/or at least a portion of a target surface and having the characteristic that it binds more firmly to the image layer than the image layer binds to the image release surface and intended for application to a target surface to which it binds less firmly than to the image release surface.

The release surface may be on a film support layer which is itself attached to a backing (such as, conveniently, paper or a synthetic material) by a release coat on a backing adhesive coat of the backing, the backing being first peelable from the support so as to leave the image visible through the film.

The film may be a polyester, which may be of polyethylene terephlthate (PET), or polyethylene naphthalate (PEN). Alternatively, the film may be polypropylene (OPP).

The image release surface may be a release coating on the support, which may comprise a wax coating.

The image release system may comprise at least one differential binding layer located over the image release surface. The differential binding layer may be a lacquer.

The surface may be corona discharge treated, however, and may have a surface tension to an applied image of 38–39 dynes/cm$^2$.

The image release system may bind the adhesive layer to the image release surface with a surface tension 4–5 dynes/cm$^2$ less than that at which it binds the image layer to the image release surface.

The method for preparing a pressure-applied image transfer sheet and the image transfer system for use therewith will now be described with reference to the accompanying drawings in which:

FIG. 6 is a face-on view of a transfer sheet bearing a plurality of images for transfer to a compact disc;

FIG. 7 shows an image transfer sheet and a compact disc a) before, b) during and c) after contacting of the sheet and the disc;

FIG. 8 is a face-on view of a compact disc with a) an adhesive layer over substantially the entire surface of the disc and b) two adhesive layers in selected portions of the surface;

FIG. 9 shows an example of apparatus for automated transfer of images to compact discs;

FIGS. 1 to 5 illustrate a first method for preparing a pressure-applied image transfer sheet for applying an image to a target surface.

FIG. 1 shows the face-on view of a typical image transfer sheet 11 with various images 12 thereon any one of which can be transferred at a time by rubbing-down or pressing on to the target surface. The images are, of course, reversed.

Figure 1:
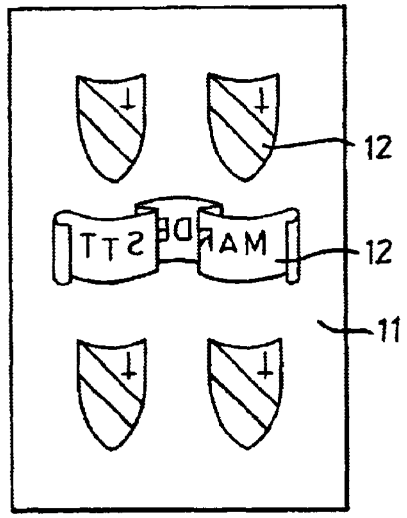
FIG. 1 is a face-on view of a transfer sheet bearing images for transfer to a target surface.
Figure 2:
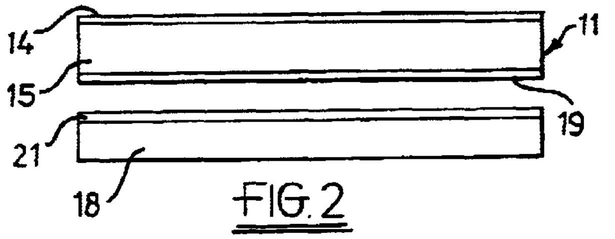
FIG. 2 is a cross-section of an unimaged transfer sheet arrangement, with components separated.
Figure 3:
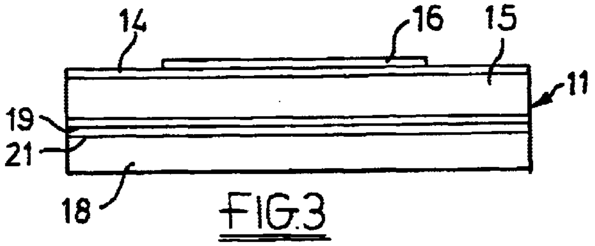
FIG. 3 is a cross-section of an imaged transfer sheet, with the components adhered together.
Figure 5A:
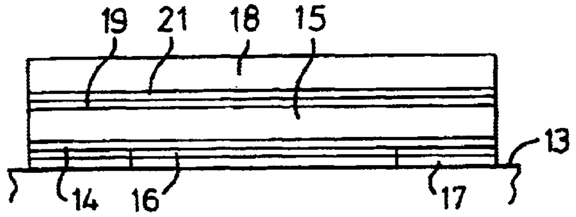
FIG. 5 is a sequence, A, B, C, D of steps in the application of the image to a target surface.

The imaged sheet 11 of FIG. 1 is made by applying an image layer 16, FIG. 3, to a blank sheet 11 as illustrated in FIG. 2, which comprises an image release system 14 on a support 15, the image release system 14 solely comprising, in this example, an image release surface. A pressure-activated and/or heat activated adhesive layer 17 is applied over the image release surface 14 including the image layer 16, as seen in FIG. 5A, which layer 17 adheres more strongly to the image layer 16 than does the image release surface 14.

Figure 5B:
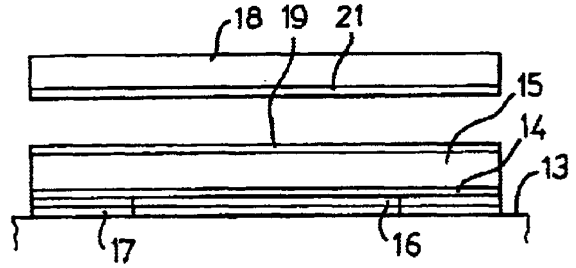
Figure 5C:
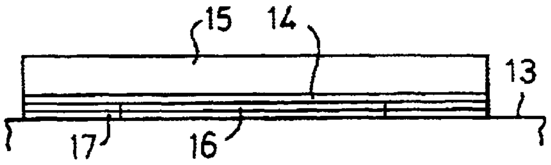

When the dried adhesive layer 17 is applied to the target surface 13 with the application of pressure, e.g. rubbing down, as in FIG. 5C, and/or heat, it attaches to the target surface 13 only in the image area but is otherwise retained by the support 15.

Figure 5D:
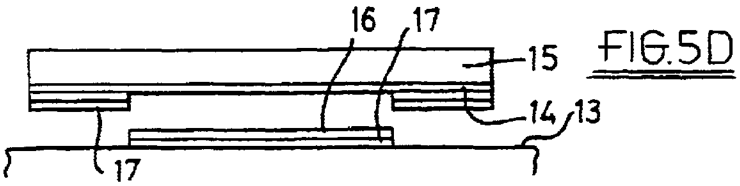

The support 15 is then peeled off the target surface 13 together with the adhesive layer 17 (FIG. 5D) except for the image area 16 which is left attached to the target surface 13 by the pressure and/or heat activated adhesive layer 17.

Clearly, for this to happen, the adhesive layer 17 must attach more strongly to the image release surface 14 than to the target surface 13, and the characteristics of the image release surface 14, the adhesive 17 and the image layer 16 may be selected so as to work with a wide variety of target surfaces 13.

The image release surface 14 is on a film support layer—the support 15—which is itself attached to a backing 18—See FIG. 2—by a release coat 19 on a backing adhesive coat 21 on the backing 18. The backing 18 is simply to act as a stiffish carrier to allow easy handling of the sheet for storage, and for feeding through an imaging system. As shown in FIG. 5B it is removed from the support 15, by virtue of the release coat 19, before the support 15 is pressed down on to the target surface 13. If the backing 18 is opaque, as for example, paper, and the support 15 of clear film, its removal clearly renders the image area 16 visible through the film support 15 for accurate positioning thereof on the target surface 13.

The image layer 16 may be applied in different ways. A dry toner medium may for example be applied in an electrophotographic process—a colour xerographic copier, for example may be used or an electrophotographic printing press. An ink could be used, however, perhaps in an electroink printing process, or a paint may be applied as by a brush. There simply needs to be a deposit on the image release surface 14 that can be taken off and transferred on to another surface.

Figure 4:
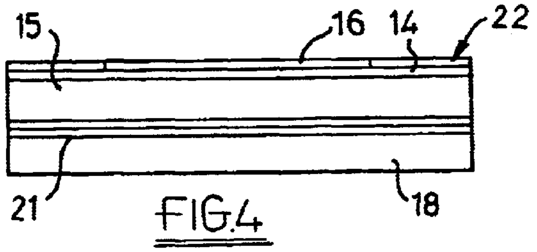
FIG. 4 is a cross-section of an imaged sheet like FIG. 3, but with a white pigment mask.

There is advantage in covering or masking the image with a white pigment 21, FIG. 4. For one thing, the pigment layer 22 protects the image layer 16 and facilitates the proper transfer of pastel shades, which arc characterized by a sparcity of pigment loading of the colour components of the dry toner, for example, and which, on that account, do not transfer very well as the adhesive layer 17 tends to attach to the support 15 in between the pigments exactly as it does outside the image area 12. It also creates opacity. The white pigment can be applied from a foil, akin to typewriter correction foil the release characteristics of the pigment from the foil being such as will allow it to come off on to the image, but not on to the image release surface. The foil can simply be laid and smoothed out on top of the image bearing face, the assembly being placed inside a stiffish paper folder to prevent any wrinkling, and the folder sent through a roller arrangement may be heated, or heat supplied in some way to assist the transfer of the white pigment on to the image area. When however, an electroink process is used to apply the image, the white pigment can be a component of the printed image, and it is unnecessary to apply a white pigment covering.

If, in a dry toner process which uses only coloured toner, not white, truly white areas are required in the image, they can be "painted" on in a manual operation using something akin to typewriter correction fluid, or printed on as by manual or machine silk screen printing, or a hot foil transfer method might be employed.

Figure 12A:
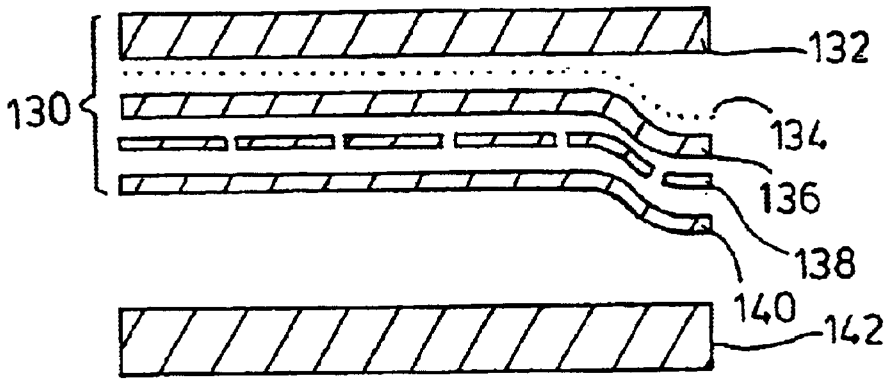
FIG. 12 shows an image transfer sheet and target surface a) before b) after image transfer and c) after post processing.

The image release surface 14 is desirably selected so that it binds the image layer 16 with an interfacial tension of 38–39 dynes/$cm^2$. The surface 14 may be treated as by a corona discharge treatment to bring about a suitable characteristic. The surface 14 can be provided by a release coat 14*a*, which may be e.g. a wax or combination of waxes with a lacquer, on the support 15. FIG. 12 shows the process of the present invention in the latter instance by reference to cross sections of the image transfer sheet and the target surface, the cross sections being taken in a region of the transfer sheet in which an image layer has been applied. FIG. 12*a* shows an image transfer sheet 130 comprising a support 132, a wax release surface 134, a lacquer differential binding layer 136 located over the image release surface 134, an image layer 138 and an adhesive layer 140. The image release system comprises the release surface 134 and the differential binding layer 136. In FIG. 12*a*, the image transfer sheet 130 is about to be applied to a target surface 142, which might be the surface of a compact disc. In a non-limiting embodiment, the use of an electroink image layer 136, a heat activated adhesive layer 140 and a polyester support 132 of 23 micron thickness has been found to be suitable in the instance in which images are transferred onto the surface of a compact disc.

Figure 12B:
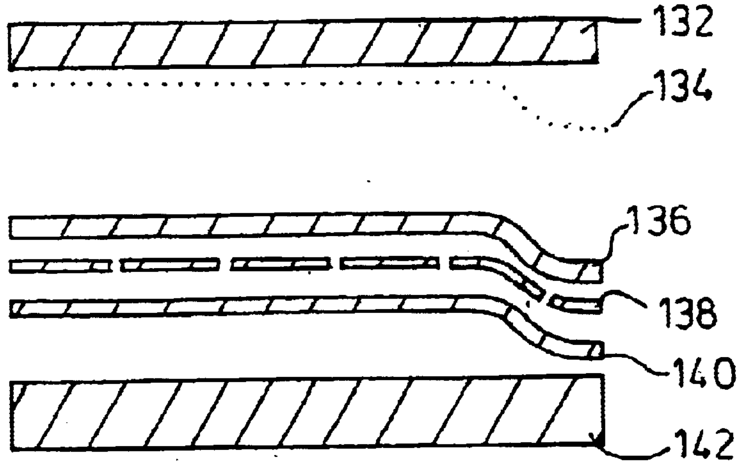
Figure 12C:
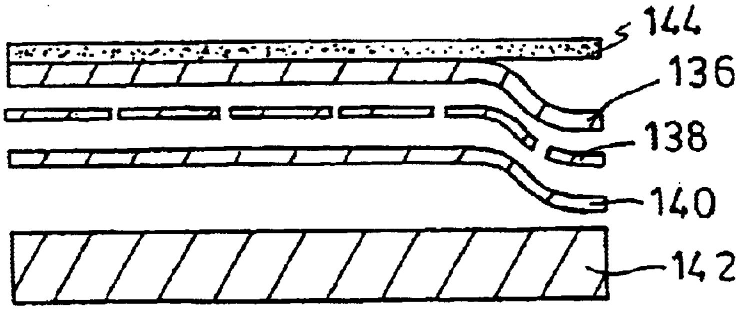

FIG. 12*b* shows the process after contact of the transfer sheet 130 with the target surface 142. In the region shown in FIG. 12*b*, the adhesive layer 140, the image layer 138 and the differential binding layer 126 remain on the target surface. It will be appreciated that in other regions of the transfer sheet 130, in which an image layer has not been applied, there is no attachment of the adhesive layer 140 to the target surface 144. FIG. 12*c* shows a post-processing step in which a UV cured hard lacquer coat 144 is applied once the image is transferred. Differential release surfaces can be modified by modifying the weights of wax and lacquer. Different surfaces 14 may need to be prepared for different techniques of image application to the surface 14.

The adhesive layer 17 can be applied just prior to application to the target surface 13, as by spraying by aerosol. For comprehensive covering of the image and surrounding area it may be recommended that spraying be executed in parallel, overlapping passes in one direction at right angles to said one direction.

The adhesive is preferably quick drying so that application to the target surface 13 can take place without undue delay, and can be low, medium or high tack, pemitting complete variability of the target surface.

In procedures other than manual application, conventional coating technology, such as roller coating the adhesive, may be preferred. In either event, organic solvent based, water based or hot melt adhesives can be used. However, the adhesive may be applied by means of an adhesive transfer sheet, when a water-based adhesive could be recommended.

Such a sheet will normally be supplied as a substrate with an adhesive coating which will transfer to the image release surface as well as to the image on it (and, of course, any white pigment areas) protected by a peel-off layer that peels from the adhesive coating without peeling that coating from the substrate.

As seen in FIG. 5C, pressure is applied, once the image 16 is correctly positioned, over the image surface to activate the pressure-activated adhesive 13. Pressure is applied, in manual procedures, by burnishing as with the fingers or fingernails or, preferably, with a burnishing tool, which may be of the type used to apply gold leaf, for example. On the other hand, a pressure roller may be used in a more automated or mechanical operation—such may of course be used hot or cold depending upon the characteristics of the adhesive layer 17, target surface 13 and so on. A stamp might be employed.

In any event, the effect is to activate the adhesive 17 which, as between the target surface 13 and the image release surface 14 binds preferentially to the latter. However, the image layer 16 binds preferentially to the adhesive 17 which, beneath the image area, firmly adheres to the target surface 13 and retains the image 11 thereupon.

The support 15 may be of any suitable film material such as PET, OPP or PEN and the image release system 14 can be a wax/lacquer thereon.

The primary requirement is for the relative attachment strengths to be such as will facilitate the required differential attachments, but for the purpose of adapting the process to the widest range of target surfaces, the figure of 38–39 dynes/$cm^2$ for the interfacial binding of the image layer 16 to the image release surface 14 has been determined to be appropriate. However, the interfacial binding strength can be referenced to the coat weight when using, for example, a lacquer/wax release coat, since the surface tension depends on the weight of wax employed. In this instance, the image release system can be said to bind the image layer to the image release surface with a surface tension of 38–39 dynes/$cm^2$, the binding being achieved through the lacquer differential binding layer.

Although several imaging media can be used the process lends itself to the production of one-off images generated digitally and transferred to the image release surface by wholly electronic means.

Also solid ink imagine techniques can be used.

Figure 10:
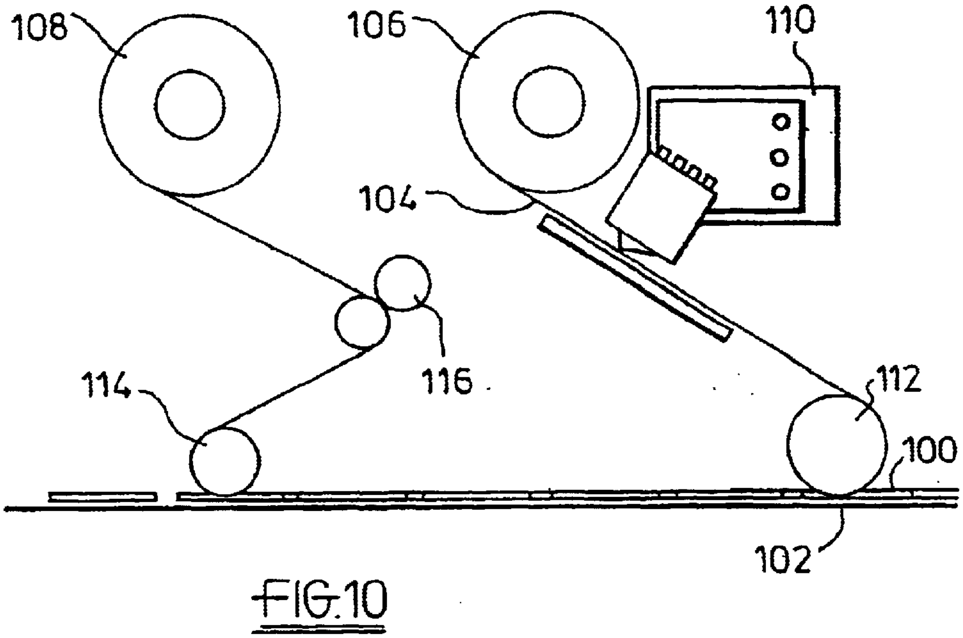
FIG. 10 shows an example of apparatus for automated transfer of images to target surfaces.

FIG. 10 shows a device suitable for the continuous application of images to target surfaces 100 arising from the above described method, in which the target surfaces 100 are fed onto a moveable web such as a conveyor belt 102. The image transfer sheet comprises a web 104 having a plurality of image areas, the web 104 being fed by rollers 106, 108. The web 104 comprises a film web having an appropriate image release surface and image areas applied thereto. Adhesive is applied to the film web 104 with an adhesive feeder unit 110, which might be a hot melt coating head. A heated pressure applying roller 112 enables the contacting, with the application of pressure and heat, of the target surfaces 100 with the web 104. The device further comprises a take off roller 114 and a tensioning roller 116. Further processing steps may be required, depending on the nature of the target surfaces 100. For example, if image transfer onto leather is being performed, a protective coating may be applied directly after image transfer. Immediate curing of this protective coating can be performed using, for example, a UV lamp. Such processing steps can be performed while the target surface 100 is still on the moveable web.

Figure 11:
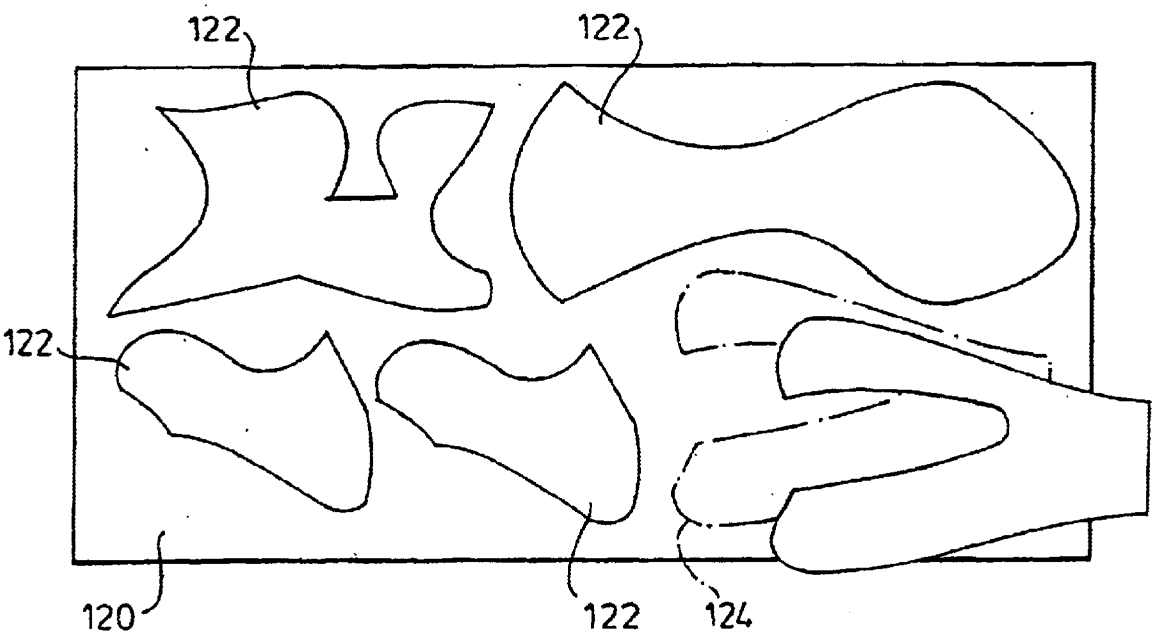
FIG. 11 shows a sheet for positioning leather items thereon.

A problem is often encountered in aligning leather items on the moveable web so that the leather items are in correct register with the applied images. This is because leather items are relatively tight, thin and flexible, making it difficult to position such items and to ensure that the items remain in place. This problem may be overcome by appropriately positioning the leather items on an adhesive coated sheet. FIG. 11 shows an adhesive coated sheet 120 with leather items 122 placed thereon. The sheet 120 is coated with a low tack pressure sensitive adhesive, and may be a clear film such as polyester film. The leather items 122—which might be components of footwear or a garment—are appropriately positioned on the sheet 120, and thereafter are held in correct alignment. The correct positioning of the leather items 122 can be achieved by laying the sheet 120 on top of a profile template onto which profile lines have been provided. Alternatively, the appropriate profile lines 124 might be printed onto the sheet 120 itself. Alternatively still, the shapes of the leather items might be cut from a sheet of leather which is of the same dimensions as the sheet. In this case, the sheet of leather can be placed, in register, onto the sheet and then peeled off, leaving the cut-out leather items. The sheet 120 with the correctly aligned leather items 122 can then be fed onto the removeable web using conventional techniques. It will be apparent that this method of aligning leather items might be employed in conjunction with other printing or transfer techniques.

FIGS. 6 to 9 illustrate a second method for preparing a pressure-applied image transfer sheet and applying an image therefrom to a target surface.

The imaged sheet 60 of FIG. 6 is similar to sheet 11 of FIG. 1 in that it is made by applying an image layer 63 to a blank sheet, the blank sheet comprising an image release system 64 on a support 65 (see FIG. 7*a*), the image release system 64 comprising an image release surface.

In contrast to the sheet 11 of FIG. 1, a pressure and/or heat activated adhesive layer 66 (FIG. 7*a*) is applied over at least a portion of the target surface 62, which adhesive layer 66 adheres more strongly to the image layer 63 than the image layer 63 does to the release surface 64.

Thereafter, the target surface 62 and the image transfer sheet 60 are contacted with the application of pressure (FIG. 7*b*), such that the dried adhesive layer 66 attaches only in the image area to the image transfer sheet 60.

The support 65 is then peeled off (FIG. 7*c*) together with the adhesive layer 66 except for the image area 61 which is left attached to the target surface 62.

The materials and procedures described above in respect of the first method are also applicable to this second method.

A particularly important application of the second method is the printing of images and labels onto compact discs, ie. in which the target surface comprises a surface—the non-playing surface—of a compact disc.

In a particularly preferred method, the image layer 63 is applied in an electroink printing process. In this way, six fully colour images 61, each suitable for application to a compact disc, can be applied to an A3 size sheet. Since a commercial available electronic apparatus (Indigo) is capable of printing thirty A3 sheets per minute. a total of 180 compact discs can be processed per minute, provided, of course, that the subsequent process steps can operate at this throughput. This compares with a printing capacity of 60 to 70 compact discs per minute using prior art methods for applying full colour images.

The support 65 is preferably a polyester such as PET or PEN. The unsupported release system 64 can be lacquer and wax. In this instance, the image release system 64 comprises the wax release surface and the lacquer differential binding layer located thereon. With polyester supports, the combination of lacquer and wax results in the image layer 63 being bound with the desirable interfacial tension of 38–39 dynes/$cm^2$. Polyurethane might be used instead as the release surface 64. A polypropylene support can undergo corona treatment to produce an interfacial tension of ca. 38–39 dynes $cm^2$, but suffers the disadvantage that it is not possible to print onto it using the electroink technique. However, it is possible to provide an ink receptive coating such as a modified PVA, which would permit the use of an electroink process.

Metallised foils and/or holographic elements might be incorporated into the image layer 63 in order to enhance the appearance of the printed compact disc.

FIGS. 8*a* and *b* show possible areas of application of the adhesive layer to the target surface 70 of a compact disc. In FIG. 8*a* an adhesive layer 72 is applied over substantially the entire surface 70 of the compact disc, whereas in FIG. 8*b* two adhesive layers 74, 76 are applied to selected portions of the surface 70 of the compact disc. Clearly, appropriately shaped image areas would be applied to the adhesive layers 74, 76, which might be slightly larger than the corresponding image areas—in this way, any slight misregistration of image with adhesive layer is compensated for. The adhesive layer can comprise a water based acrylic, although other suitable adhesives would suggest themselves to one skilled in the art.

FIG. 9 shows an example of a device suitable for the continuous application of images to compact discs, in which compact discs are fed onto a moveable web such as a conveyor belt 80. The adhesive layer is applied to the target surfaces of the compact discs using an adhesive feeder unit 82 which comprises an application roller 82*a*. The image transfer sheet comprises a web 84 having a plurality of image areas, the web 84 being fed by rollers 86, 88. A pressure applying roller 90 enables the contacting, with the application of pressure, of the surfaces of the compact discs and the web 84. The web 84 is peeled off with a take off roller 92. Fans 94, 96 and a heater 98 may be provided, depending on the precise nature of the adhesive and the roll employed. The images are transferred in register with the discs using techniques well known in the art.

It is desirable that a cured layer of lacquer is provided over the printed surfaces of the compact discs. If a UV sensitive lacquer is used as image release surface, then this lacquer layer can be cured with a flash lamp 100. Alternatively, a separate lacquer coating could be applied and cured.

There are plural advantages with the above described methods for applying images to compact discs. An extremely high throughput of 180 discs per minute is possible. Extremely high quality, full colour images may be transferred onto the discs. Furthermore, print runs of any length can be accommodated, with rapid switching between different runs. Indeed, it is possible to continually vary the nature of the transferred image. This would enable cost effective printing of personalised information onto the disc, which information might comprise a message or indicate the person to whom an item of software is licensed to. Another possibility is to print a bar code or some other identifying label. It is possible to use the method to transfer images onto leather, in which instance it may be desirable to provide a cross linking base coat between the surface of the leather and the adhesive. Additionally, it may be desirable to provide a UV cured lacquer top coat.

The invention is not limited to the above described embodiments only. Images may be transferred to other surfaces, for example glass, plastic, fabric and wood.

What is claimed is:

1. A method for preparing a pressure and heat applied image transfer sheet and applying an image therefrom to a target surface comprising:

applying an image layer to an image area of an image release system on a support, the image release system comprising a release coating comprising a wax and a lacquer that extends under and beyond borders of the image layer; then applying a pressure and heat activated adhesive layer over the image layer and the image release system beyond the border of the image layer after the image layer has been applied to the image release system, which adhesive layer adheres more strongly to the image layer than the image layer does to the release surface and the adhesive layer adheres more strongly to the release system than to the target surface;

contacting, with the application of pressure and heat, the target surface and the image transfer sheet such that the adhesive layer attaches only in the image area to the target surface;

and peeling off the support together with the portion of the adhesive layer beyond the borders of the image area, leaving the image layer attached to the target surface.

2. A method according to claim 1, in which the image layer is applied using a dry toner medium.

3. A method according to claim 1, in which the image layer is applied using an ink.

4. A method according to claim 1, in which the image layer is applied using a paint.

5. A method according to claim 1, in which the image is masked with a white pigment.

6. A method according to claim 5, in which the image is white masked with a white pigment ink.

7. A method according to claim 1, in which the image is applied using a dry toner electrophotographic process.

8. A method according to claim 7, in which the image is white pigment masked using a white pigment foil.

9. A method according to claim 1, in which the image is applied using an electroink printing process.

10. A method according to claim 1 in which the image is masked with a metallised foil.

11. A method according to claim 1 in which the image is masked with a holographic element.

12. A method according to claim 1, in which the image release system is treated to attain a suitable surface tension.

13. A method according to claim 12, in which the surface treatment is a corona discharge treatment.

14. A method according to claim 1, in which the adhesive layer is applied just prior to the contacting of the target surface and the image transfer sheet.

15. A method according to claim 1, in which the adhesive layer is applied by spraying.

16. A method according to claim 1, in which the adhesive layer is applied by roller coating.

17. A method according to claim 1, in which the adhesive is organic solvent based.

18. A method according to claim 1, in which the adhesive layer is applied by means of an adhesive sheet.

19. A method according to claim 18, in which the adhesive is water-based.

20. A method according to claim 1, in which the application of pressure is by means of a pressure roller.

21. A method according to claim 20, in which the roller is applied hot.

22. A method according to claim 1, in which the application of pressure is by a plate.

23. A method according to claim 1 in which images are transferred to a plurality of target surfaces.

24. A method according to claim 23 in which the target surfaces comprise the surfaces of objects positioned on a moveable web.

25. A method according to claim 24 in which the image transfer sheet comprises a web having a plurality of image areas, the web being fed by rollers so as to contact the target surfaces.

26. A method according to claim 25 in which the adhesive layer is applied to the web which has a plurality of image areas.

27. A method according to claim 1 in which the target surface comprises glass, plastic, fabric, wood or leather.

28. The method according to claim 1, wherein the wax and the lacquer of the release coating comprises a layer of the wax and a layer of differential binding lacquer applied to the wax.

29. A method for preparing a pressure and heat applied image transfer sheet and applying an image therefrom to a target surface comprising:

applying an image layer to an image area of an image release system on a support, the image release system comprising a release coating comprising a wax and a lacquer; then applying a pressure and heat activated adhesive layer over the image release system including the image area after the image layer has been applied to the image release system, which adhesive layer adheres more strongly to the image layer than the image layer does to the release surface;

contacting, with the application of pressure and heat, the target surface and the image transfer sheet such that the adhesive layer attaches only in the image area to the target surface;

and peeling off the support together with the adhesive layer except for the image area which is left attached to the target surface; and wherein the image release system is on a film support layer which is itself attached to a backing by a release coat on a backing adhesive coat of the backing, the backing being first peelable from the support so as to leave the image visible through the film.

30. A method for preparing a pressure and heat applied image transfer sheet and applying an image therefrom to a target surface comprising:

applying an image layer to an image area of an image release system on a support, the image release system comprising a release coating comprising a wax and a lacquer; then applying a pressure and heat activated adhesive layer over the image release system including the image area after the image layer has been applied to the image release system, which adhesive layer adheres more strongly to the image layer than the image layer does to the release surface;

contacting, with the application of pressure and heat, the target surface and the image transfer sheet such that the adhesive layer attaches only in the image area to the target surface;

and peeling off the support together with the adhesive layer except for the image area which is left attached to the target surface; and wherein the image release system binds the image layer with a surface tension of 38–39 dynes/$cm^2$.

31. A method for preparing a pressure and heat applied image transfer sheet and applying an image therefrom to a target surface comprising:

applying an image layer to an image area of an image release system on a support, the image release system comprising a release coating comprising a wax and a lacquer; then applying a pressure and heat activated adhesive layer over the image release system including the image area after the image layer has been applied to the image release system, which adhesive layer adheres more strongly to the image layer than the image layer does to the release surface;

contacting, with the application of pressure and heat, the target surface and the image transfer sheet such that the adhesive layer attaches only in the image area to the target surface;

and peeling off the support together with the adhesive layer except for the image area which is left attached to the target surface; and wherein the image release system binds the adhesive layer with a surface tension 4–5 dynes/cm$^2$ less than that which it binds the image layer.

32. A method for preparing a pressure and heat applied image transfer sheet and applying an image therefrom to a target surface comprising:

applying an image layer to an image area of an image release system on a support, the image release system comprising a release coating comprising a wax and a lacquer; then applying a pressure and heat activated adhesive layer over the image release system including the image area after the image layer has been applied to the image release system, which adhesive layer adheres more strongly to the image layer than the image layer does to the release surface;

contacting, with the application of pressure and heat, the target surface and the image transfer sheet such that the adhesive layer attaches only in the image area to the target surface;

and peeling off the support together with the adhesive layer except for the image area which is left attached to the target surface; and wherein the release system binds the adhesive layer with a surface tension of 34 dynes/cm$^2$.

33. A method for preparing a pressure and heat applied image transfer sheet and applying an image therefrom to a target surface comprising:

applying an image layer to an image area of an image release system on a support, the image release system comprising a release coating comprising a wax and a lacquer; then applying a pressure and heat activated adhesive layer over the image release system including the image area after the image layer has been applied to the image release system, which adhesive layer adheres more strongly to the image layer than the image layer does to the release surface;

contacting, with the application of pressure and heat, the target surface and the image transfer sheet such that the adhesive layer attaches only in the image area to the target surface;

and peeling off the support together with the adhesive layer except for the image area which is left attached to the target surface; and wherein the target surface comprises a surface of a compact disc.

34. An image transfer system comprising a pressure and heat applied image release system on a support, the image release system comprising an image release coating comprising a wax and a lacquer and adapted to receive an image layer on any part of the image release system which image layer is releasably held on said image release system, defining an image area, and a pressure and heat activated adhesive applied to the image layer after the image layer has been applied to the image release system, the adhesive also being applied to the release system beyond borders of the image layer, the adhesive having the characteristic that it bonds more firmly to the image layer than the image layer bonds to the image release system and is intended for application to a target surface to which it binds less firmly than to the image release system.

35. A system according to claim 34, in which the lacquer comprises a differential binding layer located over the wax.

36. A system according to claim 34, in which the image release surface is corona discharge treated.

37. A system according to claim 34, wherein the wax and the lacquer of the release coating comprises a layer of the wax and a layer of differential binding lacquer applied to the wax.

38. An image transfer system comprising a pressure and heat applied image release system on a support, the image release system comprising an image release coating comprising a wax and a lacquer and adapted to receive an image layer on any part of the image release system (the image area) which image layer is releasably held on said image release system, and a pressure and heat activated adhesive to be applied after the image layer has been applied to the image release system including the image area, the adhesive having the characteristic that it bonds more firmly to the image layer than the image layer bonds to the image release system and is intended for application to a target surface to which it binds less firmly than to the image release system; and wherein the release system is on a film support layer which is itself attached to a backing by a release coat on a backing adhesive coat of the backing, the backing being first peelable from the support so as to leave the image visible through the film support layer.

39. A system according to claim 38, in which the film support layer is a polyester.

40. A system according to claim 38, in which the film support layer is polyethylene terephthalene.

41. A system according to claim 38, in which the film support layer is polyethylene naphthalate.

42. A system according to claim 38, in which the film support layer is polypropylene.

43. An image transfer system comprising a pressure and heat applied image release system on a support, the image release system comprising an image release coating comprising a wax and a lacquer and adapted to receive an image layer on any part of the image release system (the image area) which image layer is releasably held on said image release system, and a pressure and heat activated adhesive to be applied after the image layer has been applied to the image release system including the image area, the adhesive having the characteristic that it bonds more firmly to the image layer than the image layer bonds to the image release system and is intended for application to a target surface to which it binds less firmly than to the image release system; and wherein the image release system has a surface tension to an applied image of 38–39 dynes/cm$^2$.

44. A method for preparing a pressure and heat applied image transfer sheet and applying an image therefrom to a target surface comprising:

providing an image release system on a support sheet, the image release system comprising a release coating comprising a wax and a lacquer; then applying an image layer to portions of the image release system; then coating with an adhesive the image layer and areas of the image release system that are not covered by the image layer after the image layer has been applied to the image release system, the adhesive adhering more strongly to the image layer than the image layer does to the image release system; then contacting the adhesive with the target surface and applying heat and pressure to the support sheet to cause the adhesive to adhere to the target surface but with less adherence than the adhesive does to the image release system; then peeling off the support sheet along with the adhesive that coated the areas of the image release system not covered by the image layer, leaving the image layer attached to the target surface.

45. The method according to claim 44 wherein the adhesive adheres to the image release system less strongly than the image layer does to the image release system.

46. A system according to claim 44, wherein the wax and the lacquer of the release coating comprises a layer of the wax and a layer of differential binding lacquer applied to the wax.

* * * * *